United States Patent
Gonyou et al.

(10) Patent No.: US 6,340,285 B1
(45) Date of Patent: Jan. 22, 2002

(54) END RAIL COOLING FOR COMBINED HIGH AND LOW PRESSURE TURBINE SHROUD

(75) Inventors: Craig Alan Gonyou, Blanchester; Roger Lee Doughty, Cincinnati; Monty Lee Shelton, Loveland, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/590,590

(22) Filed: Jun. 8, 2000

(51) Int. Cl.$^7$ ............................................. F04D 31/00
(52) U.S. Cl. .................. 415/116; 415/138; 415/139; 415/176
(58) Field of Search ............................ 415/116, 136, 415/138, 139, 175, 176

(56) References Cited

U.S. PATENT DOCUMENTS

| | | | |
|---|---|---|---|
| 3,777,484 A | 12/1973 | Dibelius et al. | 60/39.65 |
| 3,825,364 A | 7/1974 | Halila et al. | 415/116 |
| 4,127,357 A | 11/1978 | Patterson | 415/116 |
| 4,157,232 A | 6/1979 | Bobo et al. | 415/116 |
| 4,177,004 A | 12/1979 | Riedmiller et al. | 415/116 |
| 4,303,371 A | 12/1981 | Eckert | 415/116 |
| 4,526,226 A | 7/1985 | Hsia et al. | 165/109 |
| 4,573,865 A | 3/1986 | Hsia et al. | 415/115 |
| 4,688,988 A | * 8/1987 | Olsen | 415/116 |
| 5,071,313 A | 12/1991 | Nichols | 415/134 |
| 5,074,748 A | 12/1991 | Hagle | 415/170.1 |
| 5,088,888 A | 2/1992 | Bobo | 415/170.1 |
| 5,116,199 A | 5/1992 | Ciokajlo | 415/173.2 |
| 5,127,793 A | 7/1992 | Walker et al. | 415/115 |
| 5,158,430 A | * 10/1992 | Dixon et al. | 415/115 |
| 5,165,847 A | 11/1992 | Proctor et al. | 415/115 |
| 5,167,485 A | * 12/1992 | Starkweather | 415/115 |
| 5,169,287 A | 12/1992 | Proctor et al. | 415/115 |
| 5,188,506 A | 2/1993 | Creevy et al. | 415/115 |
| 5,273,396 A | 12/1993 | Albrecht et al. | 415/173.1 |
| 5,391,052 A | 2/1995 | Correia et al. | 415/115 |
| 5,480,281 A | 1/1996 | Correia | 415/115 |
| 5,584,651 A | 12/1996 | Pietraszkiewicz et al. | 415/115 |
| 5,641,267 A | 6/1997 | Proctor et al. | 415/173.1 |
| 5,993,150 A | 11/1999 | Liotta et al. | 415/115 |
| 5,997,247 A | * 12/1999 | Arraitz et al. | 415/139 |

\* cited by examiner

*Primary Examiner*—Edward K. Look
*Assistant Examiner*—Ninh Nguyen
(74) *Attorney, Agent, or Firm*—Andrew C. Hess; Rodney M. Young

(57) ABSTRACT

A segmented turbine cooling component, such as shroud segment for the high pressure and low pressure turbine sections of a gas turbine engine, useful in providing preferential cooling to the side rails or panels of the turbine component through the combination of cooling air fed into the intermediate pressure cavity between the discourager and primary seals and then through recesses in the bottom wall of the lower discourager seal slot that impinges air on the portion of the side panel below the discourager seal. The side panels of the turbine component have an upper primary seal slot and a lower discourager seal slot with a bottom wall having a plurality of alternating lands and recesses along the length thereof and a plurality of cooling air passages having outlets exiting into the lower slot above the lands. The subassembly can be formed from a plurality of such turbine components where the spacing of the lands and recesses of the lower discourager slots of the adjacent side panels are staggered such that the lands of the lower slot of one adjacent panel are opposite the recesses of the lower slot of the other adjacent side panel. This subassembly also has primary and discourager seals received by the respective upper and lower slots that are positioned in the gap between the adjacent panels which define the intermediate pressure cavity therebetween and trench below the discourager seal that is purged by spent cooling air from the recesses in the lower slot.

20 Claims, 10 Drawing Sheets

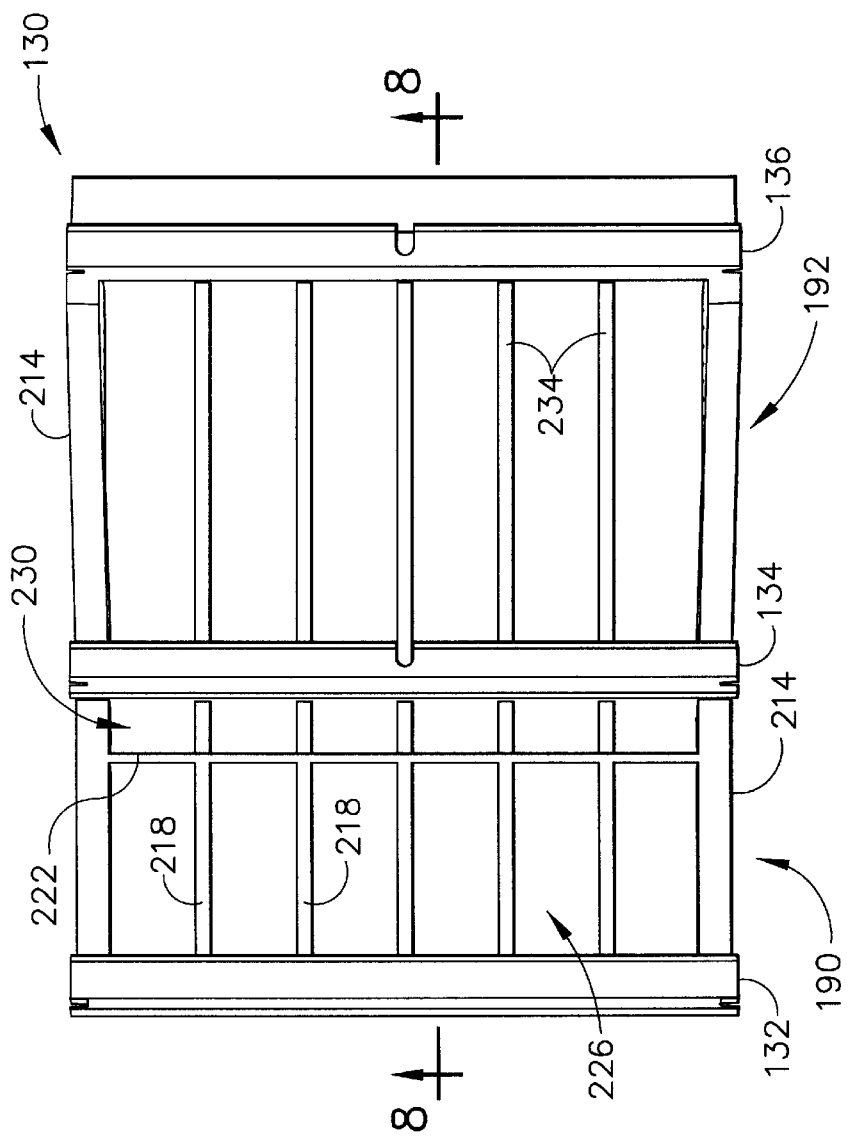
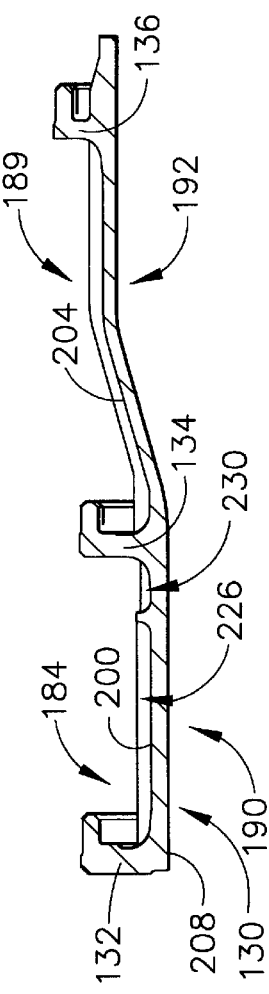
FIG. 7
FIG. 8

END RAIL COOLING FOR COMBINED HIGH AND LOW PRESSURE TURBINE SHROUD

STATEMENT REGARDING FEDERALLY SPONSORED RESEARCH

This invention was made with Government support under Contract No. N00019-96-C-0176 awarded by the Naval Air Systems Command. The Government has certain rights to the invention.

BACKGROUND OF THE INVENTION

The present invention relates generally to a gas turbine engine cooling component for end rail cooling, and in particular a turbine engine shroud where each shroud segment provides cooling to both the high pressure and low pressure turbine sections of a gas turbine engine. The present invention further relates to a turbine engine subassembly, and in particular a shroud subassembly that uses a pair of such cooling segments in combination with at least one discourager and primary spline seal.

To increase the efficiency of gas turbine engines, a known approach is to raise the turbine operating temperature. As operating temperatures are increased, the thermal limits of certain engine components can be exceeded, resulting in material failure or, at the very least, reduced service life. In addition, the increased thermal expansion and contraction of these components adversely affects clearances and their interfitting relationships with other components of different thermal coefficients of expansion. Consequently, these components should be cooled to avoid potentially damaging consequences at elevated operating temperatures.

It is common practice then to extract from the main airstream a portion of the compressed air from the compressor for cooling purposes. So as not to unduly compromise the gain in engine operating efficiency achieved through higher operating temperatures, the amount of extracted cooling air should be held to a small percentage of the total main airstream. This requires that the cooling air be utilized with the utmost efficiency in maintaining the temperatures of these components within safe limits.

A particularly important component subjected to extremely high temperatures is the shroud located immediately downstream of the high pressure turbine nozzle, immediately downstream from the combustor. The shroud closely surrounds the rotor of the high pressure turbine and thus defines the outer boundary (flow path) of the extremely high temperature main (hot) gas stream flowing through the high pressure turbine. To prevent material failure and to maintain proper clearance with the rotor blades of the high pressure turbine, adequate shroud cooling is an important concern.

Shroud cooling can be achieved by impingement cooling of the back surface of the shroud, as well as cooling holes that extend from the back surface of the base of the shroud and through to the forward or leading edge of the shroud, the bottom or inner surface of the base in contact with the main (hot) gas stream, and the aft or trailing edge of the shroud to provide both convection cooling inside the holes, as well as impingement and film cooling of the shroud. Cooling flow is also provided through the side panels or rails as convection cooling inside the cooling passages or holes, as well as impingement cooling as cooling air exits from the holes. See, for example, commonly assigned U.S. Pat. No. 5,169,287 (Proctor et al), issued Dec. 8, 1992, which shows a prior embodiment of shroud cooling of the high pressure turbine section of a gas turbine engine. This cooling minimizes local oxidation and burning of the shrouds near the hot main or core gas stream in the high pressure turbine section. Indeed, the cooling holes that exit through the side panel of the shroud of commonly assigned U.S. Pat. No. 5,169,287 can provide important impingement cooling to the side panel of the adjacent shroud.

The leading edge of the shroud is subject to the hottest flow path gas or air, and has the highest heat transfer coefficient, making this section one of the most difficult to cool. As also shown in commonly assigned U.S. Pat. No. 5,169,287, a circumferential row of holes can be angled to also exit at the leading edge of the shroud to provide both convection and film cooling at the leading edge of the shroud. As this cooling film decays and mixes with the hot flow path air, additional circumferential rows of cooling holes can be required to provide more convection and film cooling.

Another type of shroud assembly for a different type of gas turbine engine is shown in commonly assigned U.S. Pat. No. 5,127,793 (Walker et al), issued Jul. 7, 1992. As shown particularly in FIGS. 4 and 4c of U.S. Pat. No. 5,127,793, this prior shroud assembly uses single-piece shroud segments 30 that are designed to span over both the high pressure and low pressure turbine sections of the gas turbine engine. As shown particularly in FIG. 4, cooling is provided by directing a portion of the cooling air 74 through ports 78 and through segmented impingement baffles 80 and against the high pressure portion 83 of shroud segment 30. Another portion of this air 74 is directed into cavity B, with most of it being delivered to cavity C located adjacent the low pressure portions 85 of each shroud segment 30 through holes 84 formed in the support cone portion 86 of turbine shroud support 44. An impingement baffle 81 attached to shroud support 44 directs and meters impingement cooling air from cavity C onto the low pressure portion 85 of shroud segment 30. While this prior shroud design of U.S. Pat. No. 5,127,793 provides significant impingement cooling to the back surface of shroud segment 30 in both the high and low pressure sections, it provides no impingement cooling to the side panels or rails of adjacent shroud segments.

The shroud assembly shown in commonly assigned U.S. Pat. No. 5,127,793 extends from approximately the aft end of the upstream turbine nozzle to approximately the leading edge of the downstream turbine nozzle and encloses (i.e., provides a 360° annular structure around) the outer air flow path of a gas turbine engine that typically has a turning nozzle to direct the air flow properly into the blade row, then into a row of blades in the HPT section, and then into another row of blades in the LPT section. Axial gaps between these shroud segments allow for thermal growth over the large range of temperatures the gas turbine engine produces. As hot flow path air passes through the row of turbine blades, work is extracted from the air, thus creating a pressure and temperature drop axially through the blade row. As a result, both the pressure and temperature is higher at the leading edge of the shroud and lower at the trailing edge of the shroud.

A typical sealing method along the axial split lines or gaps between shroud segments is to provide a machined groove or slot in which a thin metal seal (usually referred to as a "spline seal") is placed, with pressure loading across the seal to provide positive sealing and to minimize air leakage. See FIG 11a of commonly assigned U.S. Pat. No. 5,127,793 which shows a pair of longitudinally extending slots in shroud segment 30, the lower slot receiving the lower or "discourager" spline seal, the upper slot(s) receiving the upper or "primary" spline seal(s). The portion of the axial segment gap that is set up between the shroud segments below the "discourager" seal (commonly referred to as the "trench") also has hot flow path air traveling axially down it due to the pressure gradient produced by the turbine blade row. Typically no preferential cooling is added to this "trench." Instead, in the past, air that leaks around the "discourager" seal and the conduction from adjacent metal has been deemed sufficient to cool the axial split lines, i.e., at the side rails or panels of the shroud segments. However, in more recent gas turbine engines that operate at higher temperatures, it has been discovered that oxidation and loss (melting) of the parent material along the axial split-lines of shroud segments can occur.

Accordingly, it would desirable, therefore, to provide a shroud and resulting shroud assembly, particularly for the combined high pressure and low pressure turbine sections, that creates effective impingement cooling for the side panels of adjacent shroud segments. It would also be desirable to provide such impingement cooling while efficiently utilizing the total available cooling air so as not to significantly decrease the efficiency of the gas turbine engine. It would further be desirable to provide effective cooling and purging in the "trench" between the shroud segments that are below the "discourager" seal.

SUMMARY OF THE INVENTION

The present invention relates to a turbine engine cooling component such as a shroud segment for a combined high pressure and low pressure turbine section of a gas turbine engine that provides effective end rail cooling to the side rails or panels of adjacent turbine cooling components (e.g., at the axial split lines between adjacent shroud segments), as well as effective cooling in the gap or "trench" between adjacent turbine engine cooling components (e.g., adjacent shroud segments) that is below the discourager spline seal. This turbine cooling component comprises:

(a) a circumferential leading edge;
(b) a circumferential trailing edge spaced from the leading edge;
(c) an arcuate base connected to the trailing and leading edges and having a back surface and an arcuate inner surface that is in contact with the main (hot) gas stream of the gas turbine engine moving in the direction from the leading edge to the trailing edge of the turbine component;
(d) a pair of spaced opposed axial side panels connected to the leading and trailing edges;
(e) each of the side panels having a lower discourager spline seal slot extending longitudinally from the leading edge to the trailing edge of each side panel that is capable of receiving an edge of a discourager spline seal, each lower slot having at least a bottom wall and a top wall;
(f) each of the side panels having an upper primary spline seal slot spaced above the lower slot and extending longitudinally from the leading edge to the trailing edge of each side panel that is capable of receiving an edge of a primary spline seal, each upper slot having at least a bottom wall and a top wall;
(g) a plurality of cooling air passages extending through the base from the back surface thereof and having spaced outlets exiting from at least one of the side panels between the bottom wall of the top slot and the bottom wall of the lower slot;
(h) a plurality of spaced air flow pathways along the length of the lower slot and below the bottom wall of the upper slot that are capable of receiving air flowing over and above the discourager seal when positioned in the lower slot and passing that air flow around the edge and beneath the discourager seal.

The present invention further relates to a turbine engine cooling subassembly comprising a pair of such adjacent turbine engine components, and having:

(1) opposed adjacent side panels having a gap therebetween and wherein the spacing of the air flow pathways along the length of the lower slot for each of the adjacent side panels is staggered such that the outlet of each of the cooling air passages exiting each adjacent side panel are opposite one of the air flow pathways of the other adjacent side panel;
(2) at least one discourager spline seal positioned in the gap between the opposed adjacent side panels and including a pair of spaced edges having a length and thickness such that each of the edges is capable of being received by the lower slot of one of the adjacent side panels;
(3) the at least one discourager seal being positioned below the outlet of each of the cooling air passages exiting each adjacent side panel;
(4) at least one primary spline seal positioned in the gap and including a pair of spaced edges having a length and thickness such that each of the edges is capable of being received by the upper slot of one of the adjacent side panels.

The turbine engine cooling component (e.g., shroud) of the present invention is particularly useful in providing effective, efficient and more uniform cooling to the end rail (i.e., split line) region, especially for the metal of the turbine component below the discourager seal. The turbine engine cooling subassembly (e.g., shroud cooling subassembly) of the present invention that comprises a pair of such turbine components (e.g., shroud segments) that have staggered or offset air flow pathways (preferably spaced recesses in the bottom wall of the lower slot) and outlets for the cooling air passages exiting from the adjacent side panels, also provide impingement cooling coverage to each of the adjacent side panels. In particular, this turbine cooling subassembly causes cooling air to flow: (a) over the discourager seal and then under it (via the air flow pathways such as the recesses in the bottom wall of the lower slot) to impinge on the side panel (below the lower slot) of the turbine component (e.g., shroud) from which the cooling air came from; (b) downstream above the discourager seal (via the air flow pathways) and out, such as through recesses in the bottom of wall the lower slot of same side panel from which the cooling air came to impinge on the adjacent side panel (below its lower slot); and (c) to purge the hot gas or air in the "trench" below the discourager seal.

The turbine engine cooling component of the present invention can also have certain optional but preferred features. One preferred feature is to have no cooling air passages exiting from certain portions of the side panel where cooling air flow is not required or is unnecessary, and thus economizes the usage of the total cooling air flow. Yet another preferred feature is to provide a sub-impingement pocket at the rear or aft portion of certain sections of the turbine cooling component, especially a shroud cooling segment having a high pressure turbine (HPT) section. This sub-impingement pocket helps reduce the source pressure of the cooling air provided to the rear or aft portion of the HPT section (which is usually at its lowest sink pressure in the HPT section) to provide an adequate amount of cooling air to the cooling air passages exiting from the side panel at the rear or aft portion of the HPT section and to reduce the total air flow emitting from such passages, again economizing the usage of the total cooling air flow.

BRIEF DESCRIPTION OF THE DRAWINGS

FIG. 1 is a side view of a shroud assembly that the shroud segment and subassembly of the present invention can be used in.

FIG. 7 is a top plan view of the embodiment of the shroud segment of FIG. 2.

FIG. 8 is a sectional view taken along line 8—8 of FIG. 7.

DETAILED DESCRIPTION OF THE INVENTION

Figure 1:
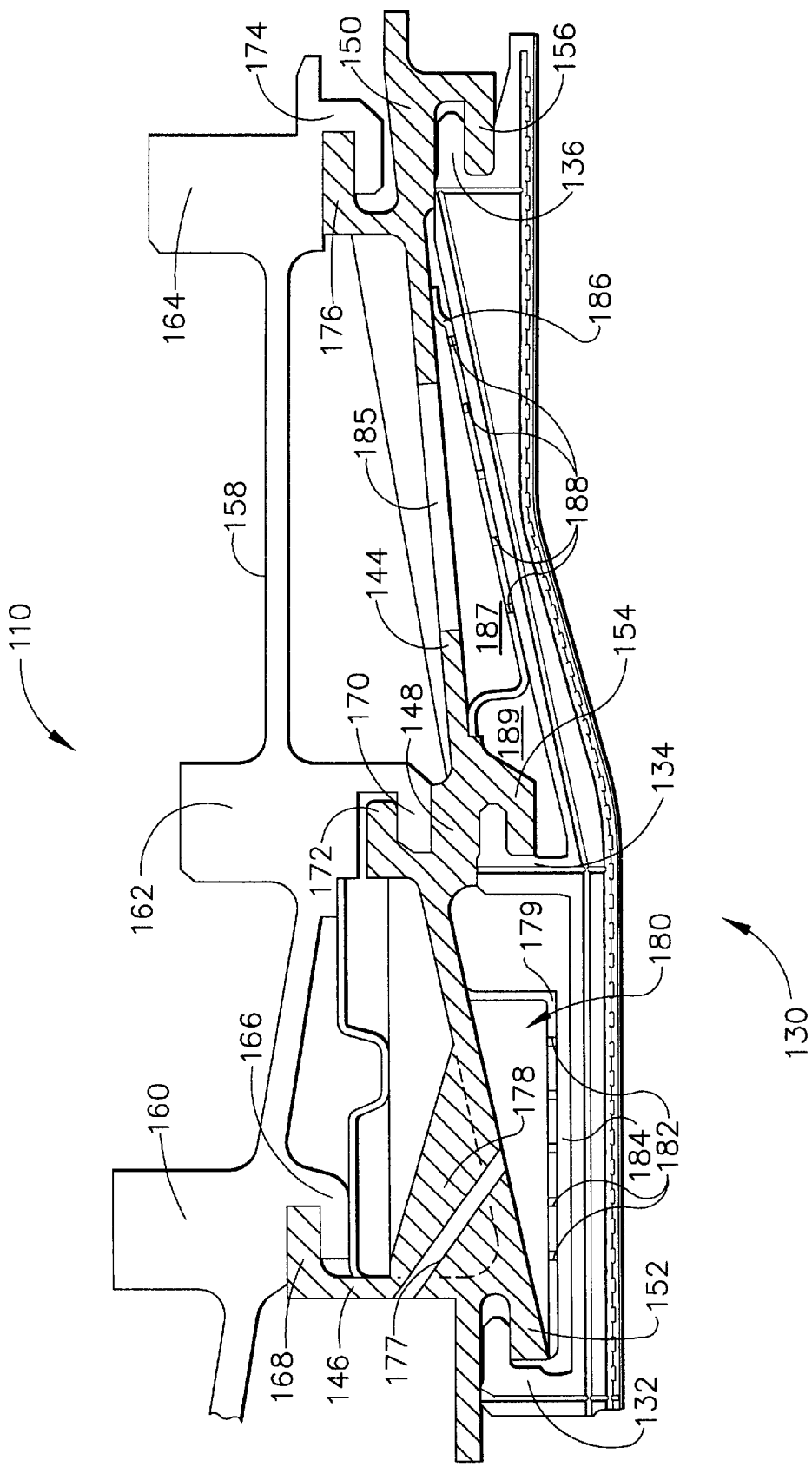

Referring to the drawings, FIG. 1 shows an embodiment of the turbine engine cooling assembly of the present invention in the form of a shroud assembly, generally indicated as 110 for the high pressure and low pressure turbine sections of a gas turbine engine. However, with appropriate modification, the turbine engine cooling assembly of the present invention can also be suitable for providing cooling to other sections in the gas turbine engine such as the nozzle and/or vane sections.

The shroud assembly of the present invention comprises turbine engine cooling components in the form of shroud segments indicated as 130 which can be either one-piece or two-piece. Shroud segment 130 is provided with a forward mounting hook 132 at the circumferential leading edge thereof. Shroud segment 130 also has a central or mid mounting hook 134 and an aft or rear mounting hook 136 at the circumferential trailing edge of shroud segment 130.

A number of shroud segments 130 are arranged circumferentially in a generally known fashion to form a segmented 360° shroud. A number of segmented shroud support structures 144 are used to interconnect the shroud segments 130. Each segmented support 144 circumferentially spans and typically supports two shroud segments 130, but could be appropriately modified to support one, three or more segments 130. For the embodiment shown in FIG. 1, there are typically 26 shroud segments 130 and 13 shroud supports 144 in the assembly, although other numbers of segments and supports can be suitable.

Each segmented shroud support 144 is provided with a forward section 146, a central or mid-section 148 and an aft or rear section 150 that each respectively have forwardly projecting hangers 152, 154 and 156. Support structure 144 supports the respective shroud segments 130 as a result of mounting hooks 132, 134 and 136 being received, respectively, by hangers 152, 154 and 156, to provide tongue-in-groove interconnections (hook-in-hanger).

Each shroud support structure 144 is further supported by a one-piece, continuous 360° annular shroud ring structure 158. The radial position of each shroud support 144, as well as each shroud segment 130, is closely controlled by three distinct 360° position control rings 160, 162, and 164 provided on ring structure 158. The front and mid-position control rings 160 and 162, are respectively formed with axially forwardly projecting hangers 166 and 170 that receive, respectively rearwardly projecting mounting hooks 168 and 172 of sections 146 and 148 of support structure 144, while the rear position control ring 164 is formed with an axially forwardly projecting hanger 174 that receives rearwardly projecting mounting hook 176 of section 150 of support structure 144, to provide circumferential tongue-in-groove interconnections (hook-in-hanger).

To maximize the radial support and radial position control provided to each shroud support 144 (and thus each shroud segment 130), each hanger 166, 170 and 174 on the support ring 158 is usually in direct axial alignment (i.e., aligned in the same radial plane) with its respective position control ring 160, 162 and 164. This alignment increases the rigidity of the entire shroud support assembly. The support ring structure 158 is typically bolted into the combustor case (not shown) at its aft end. The entire shroud support assembly is cantilevered off its forward end at the combustor case interface. The forward and mid-position control rings, which are several inches away from the combustor aft flange, are thereby divorced from any non-uniform circumferential variations in radial deflection in the combustor case.

The segmented shroud design is typically required to accommodate the thermal growth imposed by the hostile environment created by the hot flowing exhaust gas. The segmented shroud hangers effectively cut the heat conduction path between the high temperature shroud mounting hooks and the position control rings. The position control rings are thus well isolated from the hostile and non-uniform flow path environment.

A portion of high pressure cooling air extracted from the compressor (not shown) is fed through high pressure turbine section feed hole(s) 177 in boss 178 of support 144. This portion of cooling air then impinges upon pan-shaped high pressure turbine section impingement baffle 179 (attached to support 144), thus creating the upper high pressure (HP) turbine section's HP pre-impingement cavity or plenum 180. This portion of high pressure air is then feed through an array of perforations 182 in baffle 179 as cooling air into the lower HP post-impingement cavity or plenum 184 of the high pressure turbine section of shroud segment 130. Compressor cooling air is also fed through low pressure turbine feed hole(s) 185 in support 144. This other portion of cooling air impinges upon pan-shaped low pressure turbine section impingement baffle 186 that is attached to support 144, thus creating the upper low pressure (LP) turbine section's LP pre-impingement cavity or plenum 187. This other portion of cooling air is then fed through perforations 188 in baffle 186 as cooling air into the lower LP post-impingement cavity or plenum 189 of the low pressure turbine section of shroud segment 130.

Figure 2:
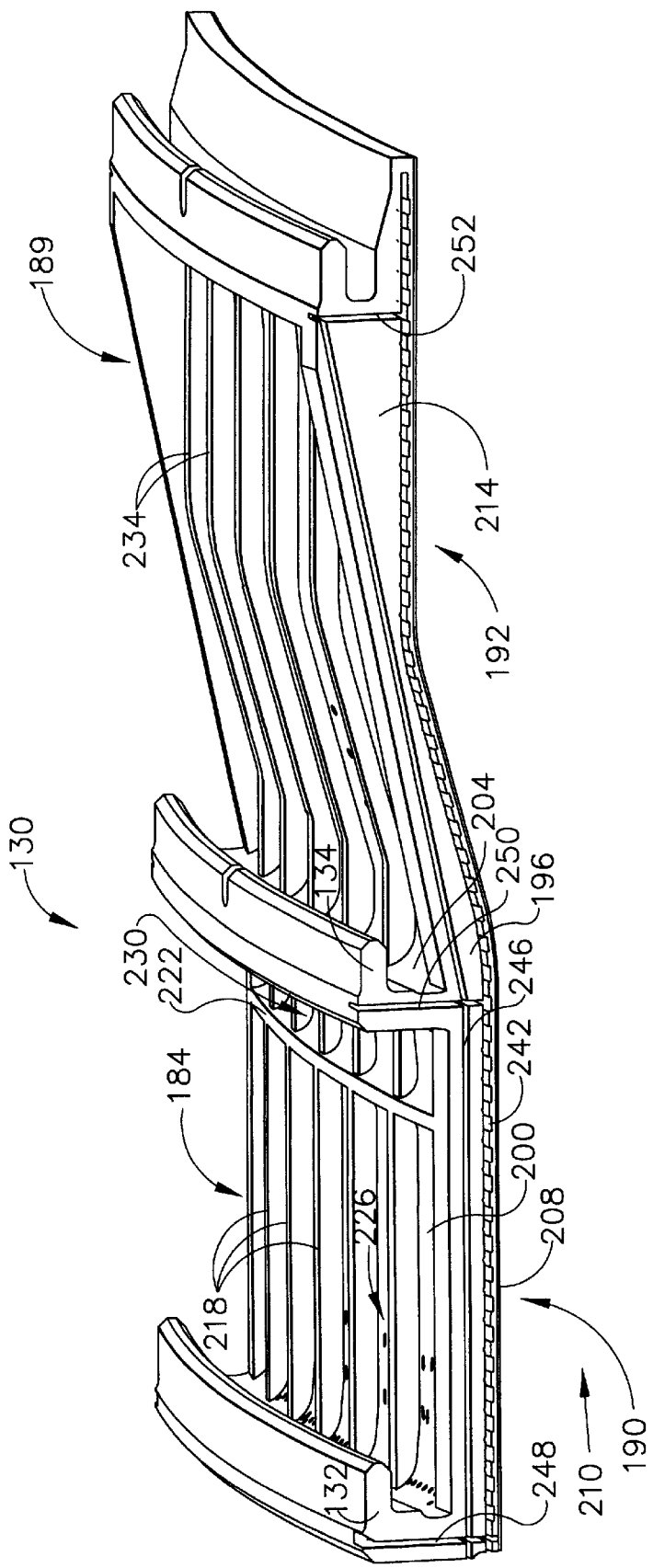
FIG. 2 is an enlarged axial side view of an embodiment of the shroud segment of the present invention.

Referring to FIGS. 2, 7 and 8, each shroud segment 130 has a forward high pressure turbine (HPT) section 190 that includes the forward mounting hook 132 at the leading edge and forward end of the shroud segment, and a rear or aft low pressure turbine (LPT) section 192 that includes aft mounting hook 136 at the trailing edge and aft end of the shroud segment. The aft end of HPT section 190 and the forward end of LPT section 192 of shroud segment 130 are joined at the central or mid-mounting hook 134 and are adjacent to, respectively, the blades of the high pressure turbine and the blades of the low pressure turbine. (For shroud segments 130 that are not one-piece, HPT section 190 and LPT section 192 can be separate pieces joined or combined together by suitable means known in the art.)

The shroud segment 130 has a base 196 that extends from forward mounting hooking 132 to aft mounting hook 136. Base 196 has an outer or back surface, portions of which are indicated as 200 in the HPT section and 204 in the LPT section. Base 196 also has an inner surface 208 that is contact with the main (hot) gas stream indicated by arrow 210 that generally moves downstream in the direction from the leading to the trailing end of the shroud segment 130. As shown in FIG. 2, inner surface 208 extends generally straight from the forward end to the aft end of the HPT section 190, but then extends diagonally upward at the forward end of the LPT section 192 to about the midpoint thereof and then extends generally straight thereafter to the aft end of the LPT section. The shroud segment also has a pair of opposed spaced side rails or panels 214 that are connected at their leading and trailing ends by mounting hooks 132 and 136, as well at their central or mid-sections by mounting hook 134 and at their bottom edges by base 196.

As also shown in FIGS. 2, 7 and 8, HPT section 190 has a plurality of spaced longitudinal ribs 218 that are connected at their respective ends by mounting hooks 132 and 134 and at their bottom edges by base 196. A laterally extending rib 222 is connected at its respective ends by side panels 214, and at the bottom edge by base 196 and divides the HP post-impingement cavity 184 (framed by mounting hooks 132 and 134, side panels 214 and base 196) into a forward higher pressure HP post-impingement pocket indicated as 226 and an aft lower pressure HP post sub-impingement pocket indicated as 230. The aft HP sub-impingement pocket 230 is fed cooling air through perforations in a secondary impingement baffle (not shown) located on top of the circumferential ribs 222 and extending aft to the mid-mounting hook 134 with its edges extending between the two respective side panels 214, this secondary impingement baffle also being fed cooling air from the HP post-impingement cavity 184. LPT section 192 also has a plurality of spaced longitudinal ribs 234 that are connected at their respective ends by mounting hooks 134 and 136 and at their bottom edges by base 196, as well as LP post-impingement cavity 189 (framed by mounting hooks 134 and 136, side panels 214 and base 196) that receives the cooling air fed through the perforations 188 in baffle 186.

Figure 3:
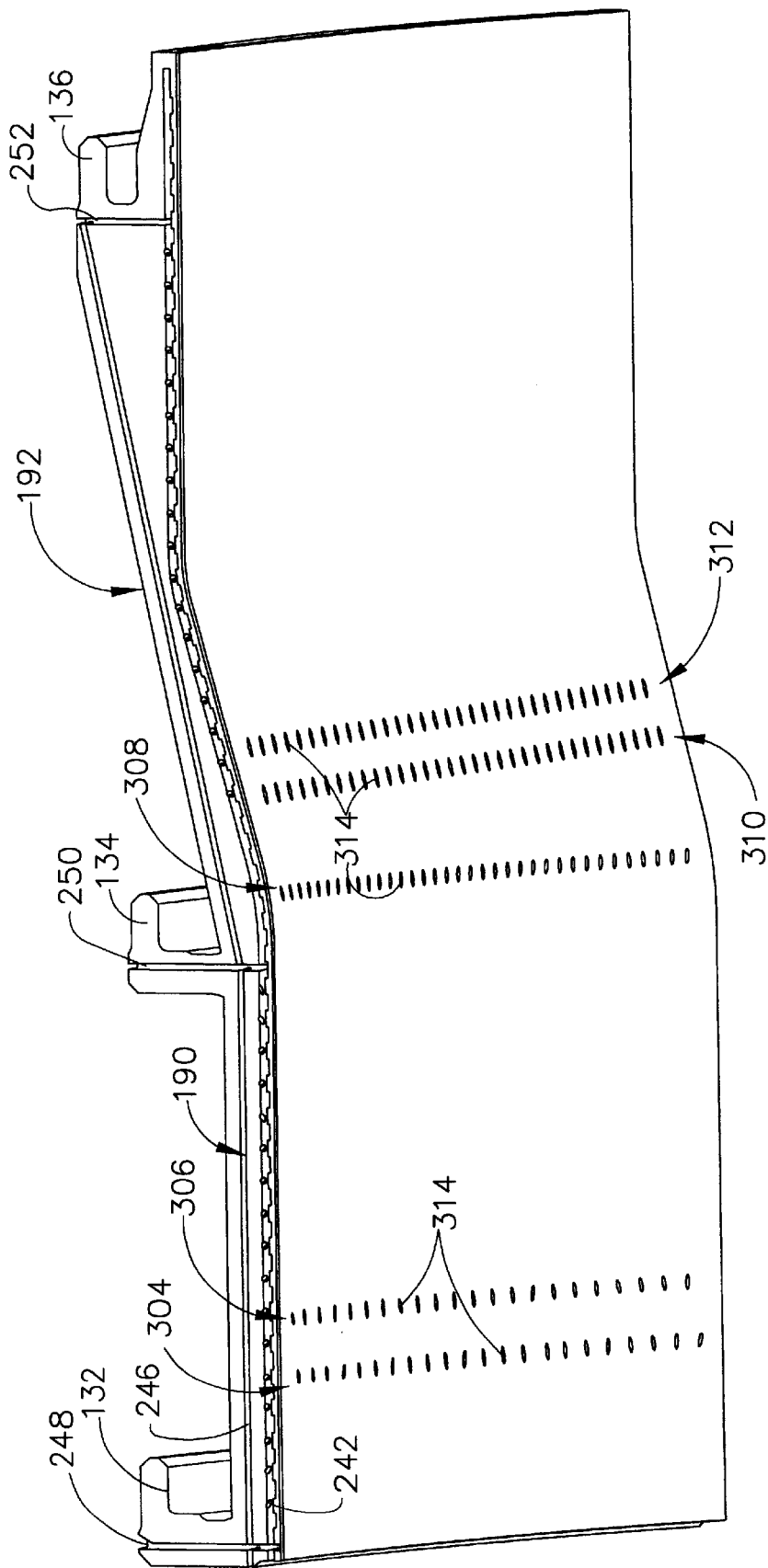
FIG. 3 is an enlarged perspective view of the underside of the shroud segment of FIG. 2.

As shown in FIGS. 2 and 3, each of the side panels 214 have a lower or discourager seal groove or slot 242 and an upper or primary seal groove or slot 246 spaced above lower slot 242. Slots 242 and 246 each extend generally longitudinally from the leading edge or forward end of shroud segment 130 and terminate at about the trailing edge or aft end for lower slot 242 and at the aft end of the lower pressure impingement cavity for upper slot 246. While slots 242 and 246 are shown as being continuous, these slots can also be in separate segments or sections, such as, example, in two separate sections, one for the HPT section, the other for the LPT section, or three separate sections where the LPT section has two separate sections for each slot, one being in the diagonal portion of the LPT section, the other being in the straight portion of the LPT section.

Also shown in FIGS. 2 and 3 are a forward vertical seal groove or slot 248 at mounting hook 132, a central or mid-position vertical seal groove or slot 250 at mounting hook 134, and an aft vertical seal groove or slot 252 at mounting hook 136. Each of the vertical slots 248, 250 and 252 originate at or near inner surface 208 of base 196 and extend upwardly to perpendicularly intersect lower and upper slots 242 and 246 and terminate at the upper end of the respective mounting hooks 132, 134 and 136.

Figure 4:
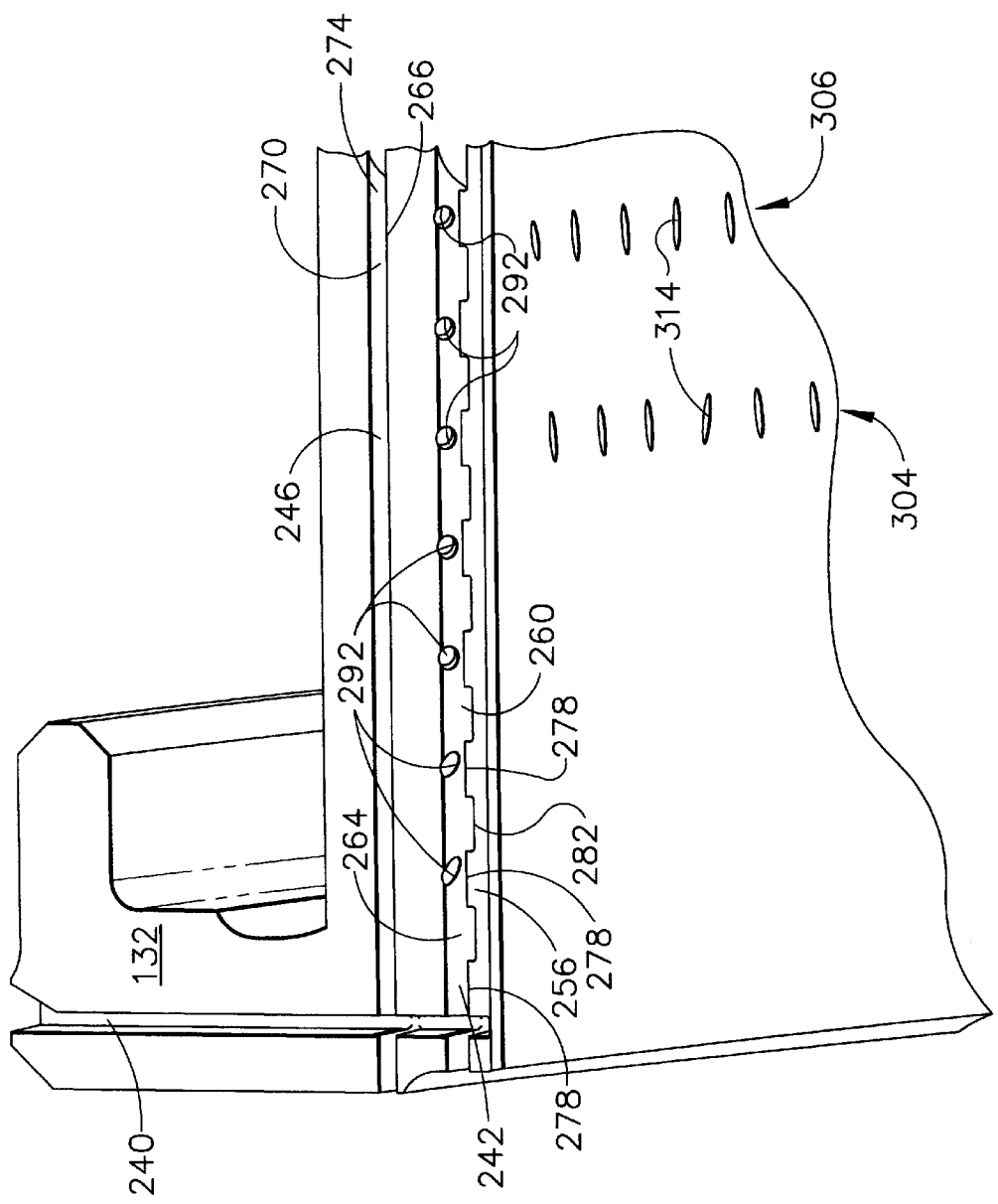
FIGS. 4 to 6 are different enlarged portions of the shroud segment of FIG. 3.
Figure 10:
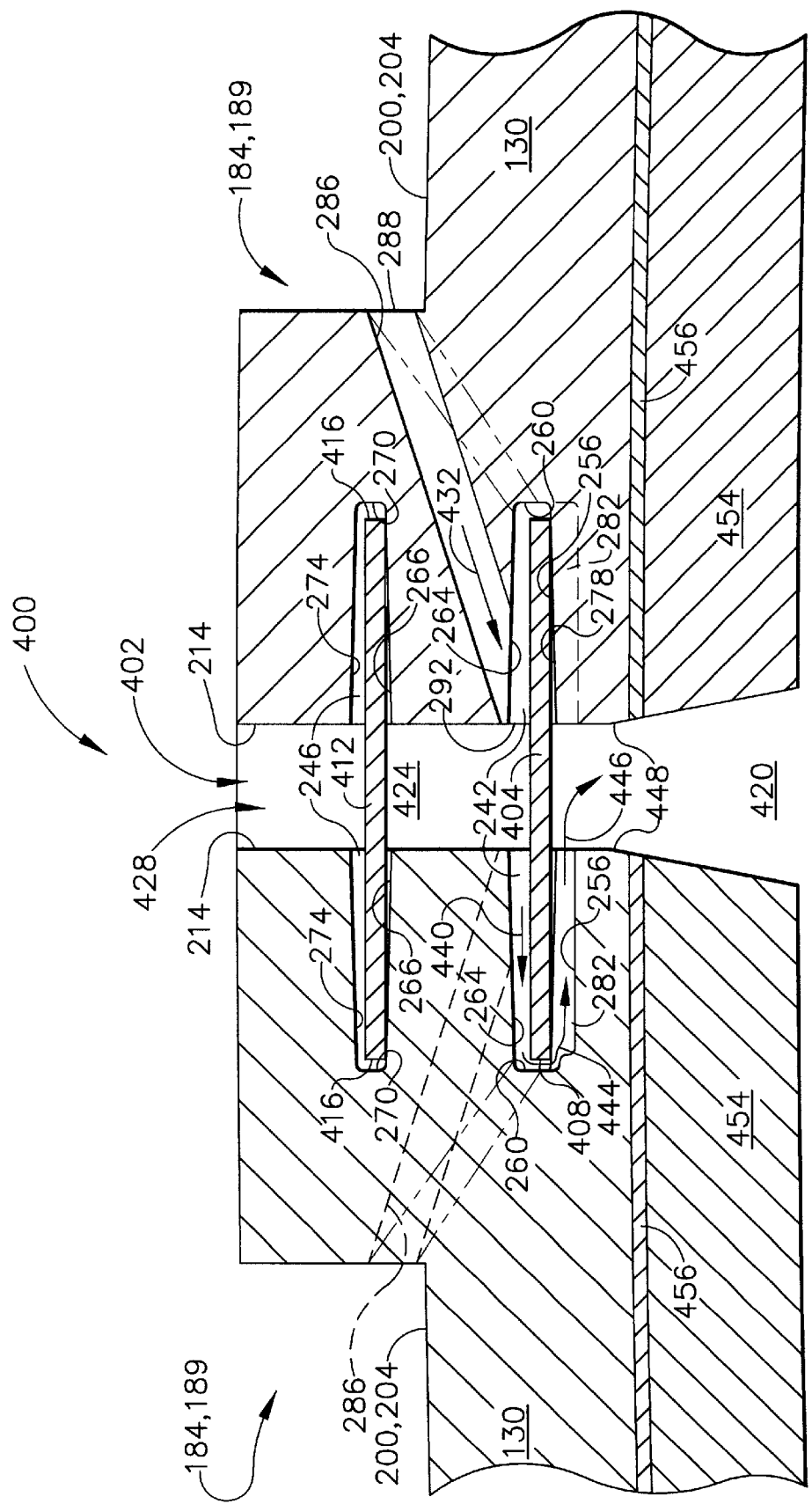
FIG. 10 is a sectional view along line 10—10 of FIG. 9.

Referring to FIGS. 4 and 10, lower slot 242 has a bottom wall 256, a side wall 260 connected at an edge to bottom wall 256 and a top wall 264 connected at an edge to side wall 260, while upper slot 246 has a bottom wall 266, a side wall 270 connected at an edge to bottom wall 266 and a top wall 274 connected at an edge to side wall 270. As shown particularly in FIG. 4, bottom wall 256 of lower slot 242 has a plurality of spaced alternating lands 278 and slots or recesses 282. While the lands 278 and recesses 282 are shown as having similar sizes and a square configuration, different sizes, as well as other shapes and configurations (such as rounded edges) can also be suitable.

Figure 9:
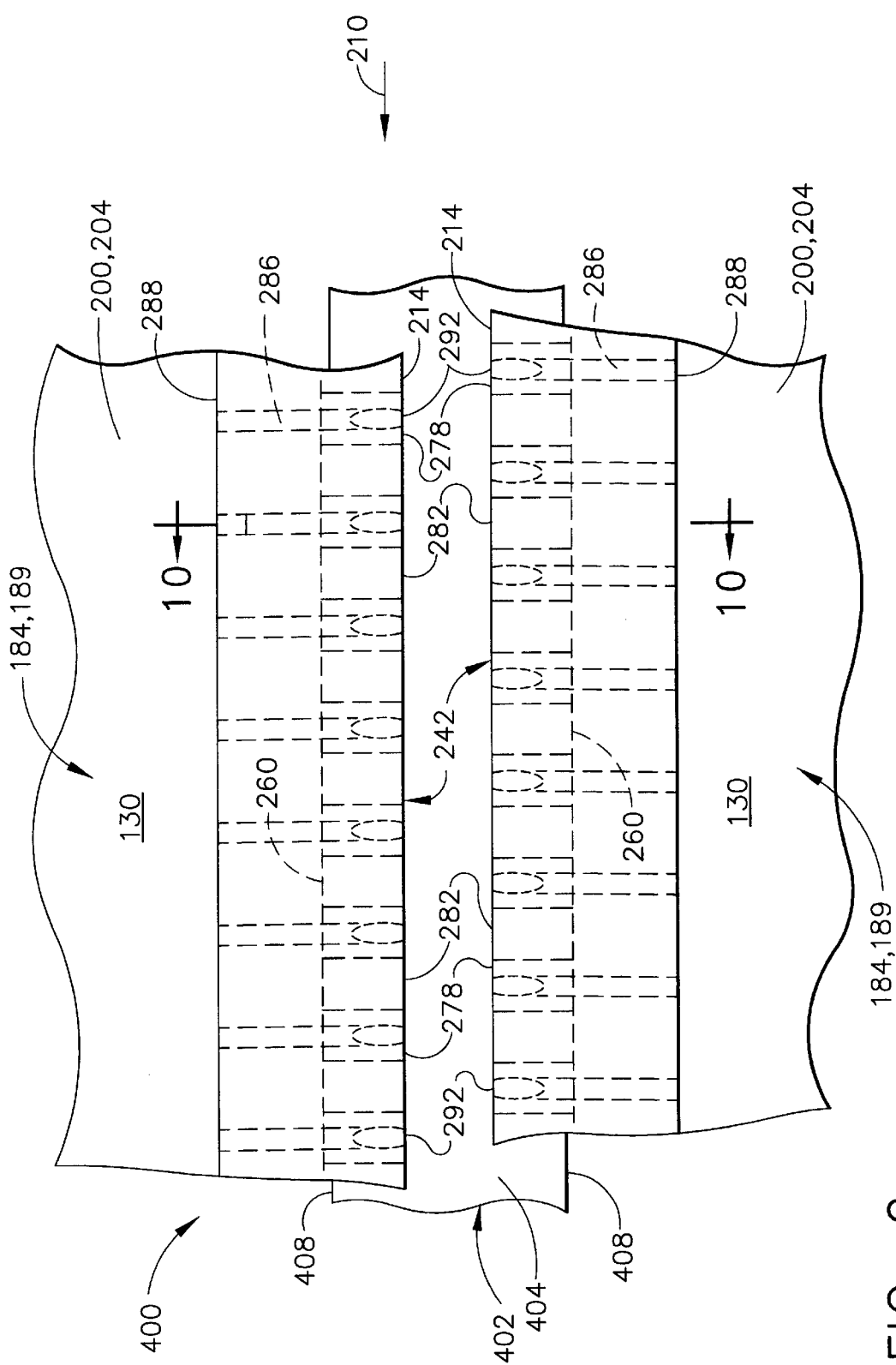
FIG. 9 is a top plan view of an embodiment of the shroud subassembly of the present invention with portions broken away.

As shown particularly FIGS. 4, 9 and 10, a plurality of elongated air cooling holes or passages 286 with inlets 288 at outer or back surfaces 200 or 204 of base 196 extend diagonally downward and radially inward through base 196 of shroud segment 130 and are shown in FIGS. 4, 9 and 10 as exiting through outlets 292 through the top wall 264 of lower slot 242, or as shown alternatively, outlets 292 can exit at about the edge connecting side wall 260 and top wall 264. For the embodiments of the present invention shown in FIG. 4, it is also important that each outlet 292 exit above one of the lands 278 for reasons to be described hereafter. However, if desired for other embodiments of the present invention, outlets 292 of passages 286 can also exit at other points on side panel 214 between the bottom wall 266 of upper slot 246 and the bottom wall 256 of lower slot 242.

Figure 5:
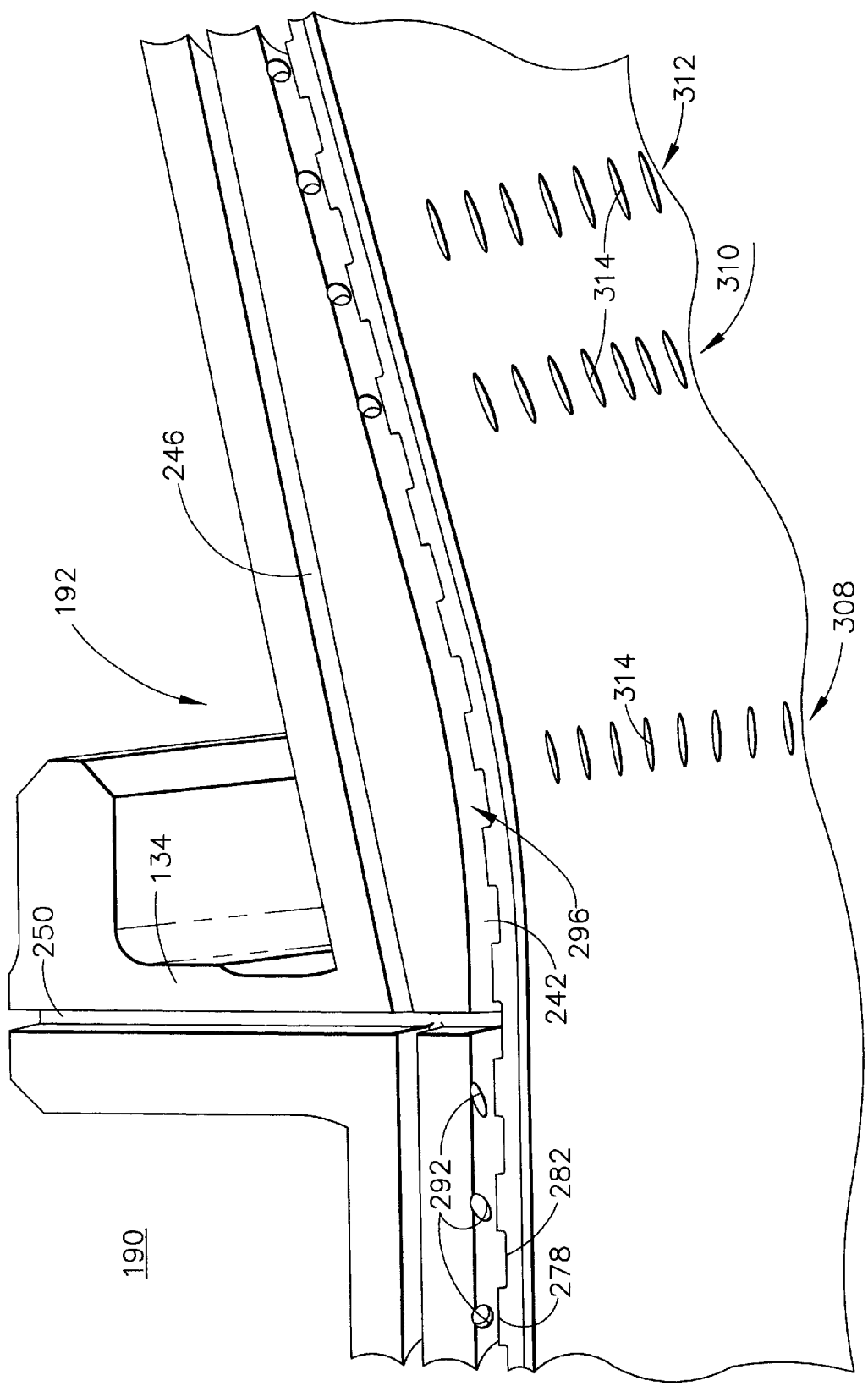
Figure 6:
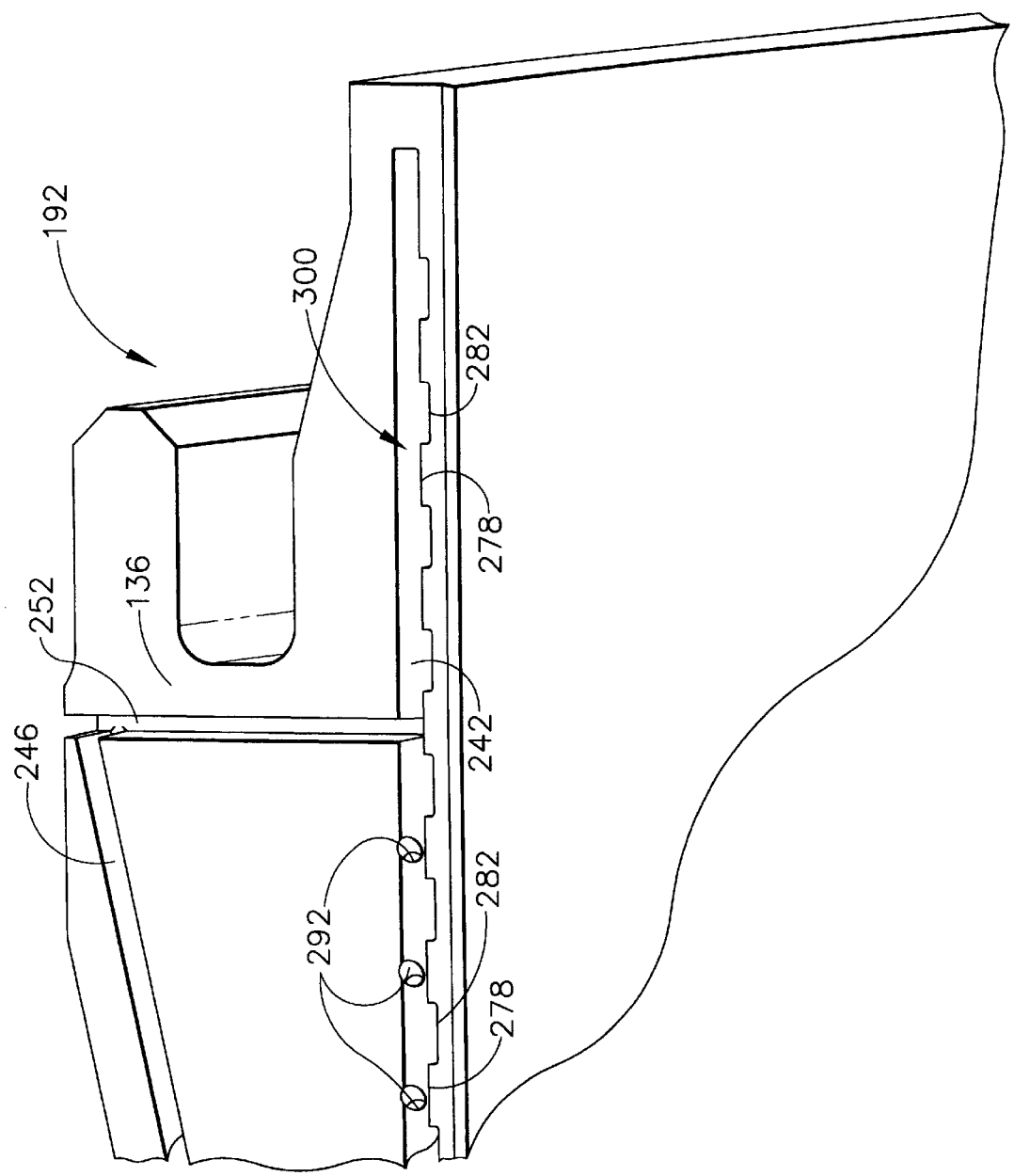

Passages 286 are usually straight and can be skewed relative to the circumferential direction and the radial direction. This skewing affords the passages 286 greater lengths, significantly greater than the base and side rail or panel thicknesses, and increases their convection cooling surfaces. The passages 286 are typically spaced along the HPT section 190 and the LPT section 192 such that their respective outlets 292 that exit into lower slot 242 are also spaced along the entire length of the lower slot. While passages 286 exit through outlets 292 in a continuous pattern along the entire length of slot 242, it is preferred in the shroud segments of the present invention that such passages not exit at certain sections of the lower slot to economize the usage of the total cooling air flow. One such section, shown in FIG. 5, is at about the transition point indicated as 296 between the aft end of HPT section 190 and the forward end of the LPT section 192. By leaving out passages 286 at this transition point 296, the wasteful flow of cooling air from the HPT section to the LPT section is prevented or minimized. As shown in FIG. 6, another such section where cooling air passages 286 are typically unnecessary is at the point indicated as 300 at about the trailing edge or aft end of the LPT section. At this point in the LPT section, there is usually sufficient air flow axially and aft along lower slot 242 to adequately cool side panels 214 without additional cooling air being delivered by passages 286, again avoiding the wasteful use of the total cooling air flow.

The forward HP post-impingement pocket 226 feeds cooling air to inlets 288 of passages 286 that exit through outlets 292 in the forward portion of the HPT section 190, while aft sub-impingement pocket 230 feeds cooling air to inlets 288 of passages 286 that exit through outlets 292 in the aft portion of the HPT section 190. The sub-impingement pocket 230 is important for conserving the total cooling air flow with respect to the last few (typically 4) passages 286 that exit through outlets 292 at the aft end of HPT section 190. In particular, pocket 230 reduces the pressure of the cooling air flow from post-impingement plenum 184 before it enters inlets 288 of passages 286 at the aft end of HPT section 190.

As shown in FIGS. 3 to 6, shroud segment 130 can have additional rows of cooling passages, five of which are indicated as 304, 306, 308, 310 and 312 that extend from the outer or back surfaces 200 or 204 of base 196, through base 196 and then exit through outlets 314 from inner surface 208. Like passages 286, passages 304, 306, 308 and 310, 312 are usually straight and can extend in directions skewed relative to the circumferential direction and the radial direction to provide greater lengths to increase their convection cooling surfaces. Air flowing through the passages in rows 304, 306, 308, 310 and 312 convection cool HPT section 190 and LPT section 192 of shroud segment 130. Having served this purpose, the cooling air exiting from outlets 314 of these rows of passages mixes flows along inner surface 208 to film cool the shroud segment.

Another aspect of the present invention is the shroud subassembly, an embodiment of which is shown in FIGS. 9 and 10 and is indicated generally as 400. As shown particularly in FIG. 10, subassembly 400 comprises a pair of adjacent shroud segments 130 that have opposed adjacent side panels 214 that are separated by an circumferential segment gap generally indicated as 402. As particularly shown in FIG. 9, the lands 278 and recesses 282 of lower slot 242 of each of the adjacent side panels 214 are spaced to be staggered or offset relative to each other such that the lands of the lower slot of each adjacent side panel are opposite the recesses of each adjacent side panel. As a result, each of the cooling passages 286 having outlets 292 exiting into the lower slot 242 (above one of the lands 278) are also opposite a recess 282 of the lower slot of the adjacent side panel.

As shown in FIGS. 2, 3, and 9, the alternating lands 278 and recesses 282 typically extend continuously along the bottom wall 256 of the entire length of lower slot 242 of each of the adjacent side panels 214. However, these alternating lands 278, and especially recesses 282, need not be continuous or along the entire length of lower slot 242. For example, for those sections of the lower slot 242 (such as those shown in FIGS. 5 and 6) where passages 286 do not exit into lower slot 242, that portion of bottom wall 256 of the lower slot 242 of the adjacent side panel 214 need not have recesses 282 formed therein.

Subassembly 400 further comprises a lower discourager spline seal 404 positioned in gap 402 that has spaced edges 408 that are received by lower slots 242 (above the lands 278) of the adjacent side panels 214 of the pair of shroud segments 130. Subassembly 400 also includes an upper primary spline seal 412 positioned in gap 402 that has spaced edges 416 that are received by upper slots 246 of the adjacent side panels 214 of the pair of shroud segments 130. The discourager seal 404 and primary seal 412 essentially divide gap 402 into three sections that are referred to hereafter as the bottom cavity or trench 420, the intermediate pressure cavity or chute 424 and the top post-impingement cavity 428. The intermediate pressure cavity or chute 424 defined between the discourager seal 404 and the primary seal 412 is typically divided into a forward HPT portion and an aft LPT portion by the vertical spline seal received by the respective central or mid-vertical slots 250 of each of the adjacent side panels 214. This chute 424 has a pressure lower than the pressure of the HP post-impingement cavity 184 and the LP post-impingement cavity 189 and higher than local gas stream pressure 210, i.e., in the vicinity of HPT section 190 and LPT section 192.

The width of each of seals 412 and especially 404 is such that they are smaller than the combined width of gap 402 and slots 242, 246 of each of the adjacent side panels 214. This is particularly important for lower slots 242 of each adjacent side panel 214 so that the portion of each recess 282 adjacent side wall 260 can remain uncovered by seal 404 and thus be accessible to air flow. While seals 404 and 412 are shown as being one continuous piece, they can also be separate sections, especially if, for example, slots 242 and 246 are separate sections or segments.

As shown particularly in FIG. 10, cooling air indicated by arrow 432 flows down passage 286 and exits outlet 292. At this point, this air flow 432 can go via one of two pathways which can provide impingement cooling to those portions of side panels 214 adjacent trench 420. One pathway is to flow axially downstream in chute 424 towards the trailing edge of shroud segment 130 and exit from a recess 282 on the same side as passage 286 from which air flow 432 came, into trench 420 to impinge on the portion below seal 404, as indicated by 448, of the adjacent side panel 214 and to purge the hot gas in trench 420. The other pathway is to flow circumferentially over discourager seal 404 to enter lower slot 242 of the adjacent panel 214 as indicated by arrow 440, flow around edge 408 of seal 404 and into the uncovered portion of recess 282 adjacent side wall 260 as indicated by arrow 444, and then out of recess 282 as indicated by arrow 446 into trench 420 to impinge on the portion below seal 404, as indicated by 448, of the same side panel 214 from which the air flow 432 came and to purge the hot gas in trench 420. (As shown in FIG. 10, the lower portion 448 of each of the respective side panels 214 also includes the thermal barrier coating indicated by 454 that is attached to the metal portion of shroud segment 130 by a bond coat indicated by 456.)

Figure 11:
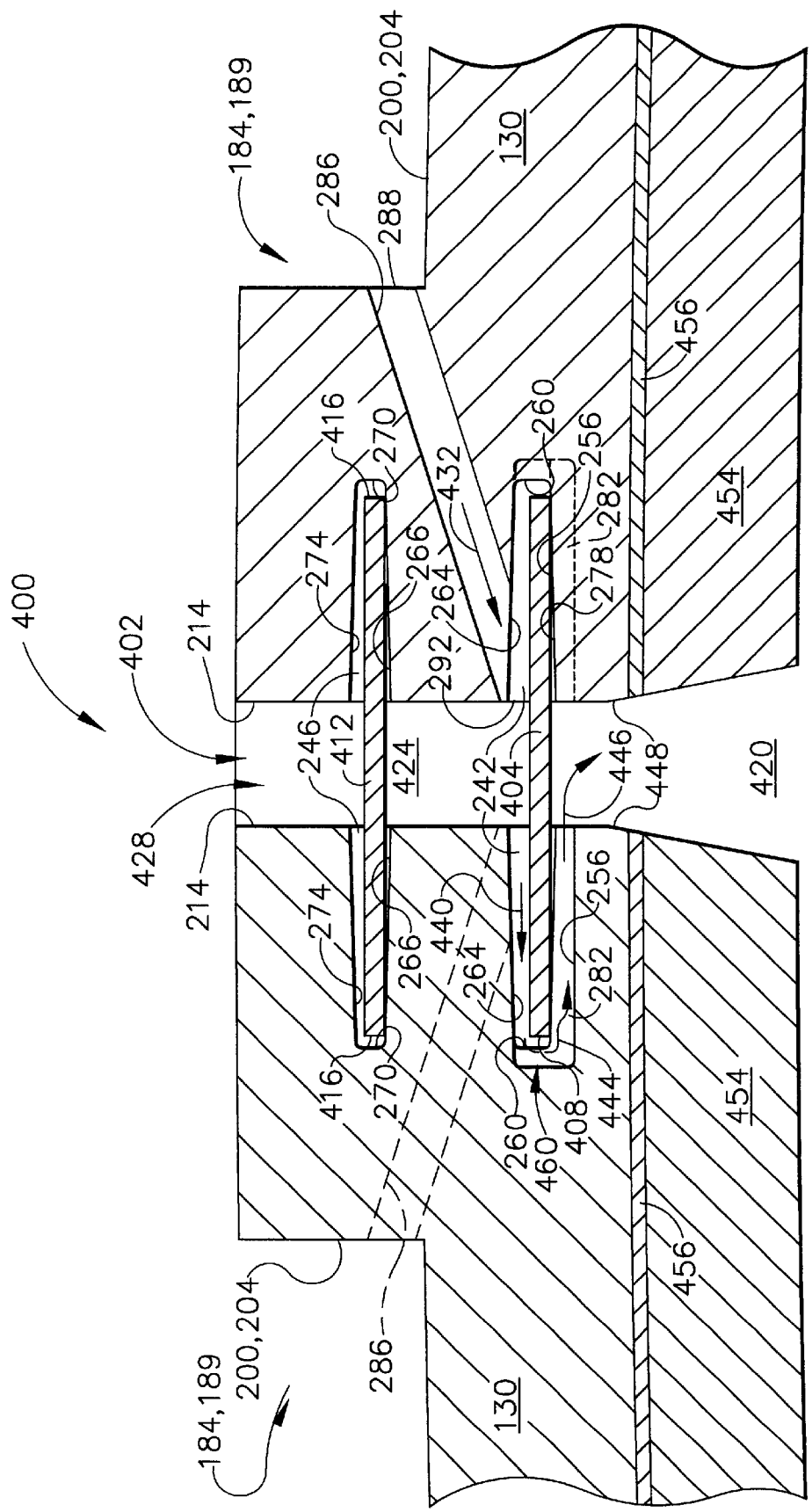
FIG. 11 is a similar view to FIG. 9 but showing an alternative embodiment of the shroud segment and shroud assembly of the present invention.

Because discourager seal 404 is typically not stationary but can move freely with lower slots 242, it is possible for edges 408 to butt against side wall 260 of slot 242 and thus cover recesses 282 so they are partially or completely inaccessible to the flow air. As shown in FIG. 11, an alternative embodiment of the present invention is to extend each recess 282 into and up side wall 260 above the adjacent lands 278 of slot 242 as indicated by 460 so that if edges 408 of seal 404 do butt against side wall 260 of slot 242, recesses 282 will remain uncovered by seal 404 and thus accessible to the flow of air. While the embodiment of the present invention shown in FIGS. 9 to 11 provides air flow pathways spaced along the length of lower slot 242 in the form of recesses 282 for receiving air flowing into slot 242 (see arrow 440) that then flows over and around the edge 408 of the seal 404 (see arrow 444) and then passing that air flow beneath seal 404 (see arrow 446), other designs of air flow pathways that are below bottom wall 266 of upper slot 246 (and primary seal 412) are also suitable. For example, a plurality of spaced arcuate passages could be formed in side panels 214 that are opposite the respective outlets 292 of passages 286 and have inlets above and outlets below lower slot 242 so that the flow of air 432 in chute 424 can be directed around and beneath seal 404.

While specific embodiments of the present invention have been described, it will be apparent to those skilled in the art that various modifications thereto can be made without departing from the spirit and scope of the present invention as defined in the appended claims.

What is claimed is:

1. A turbine engine cooling component for a gas turbine engine, which comprises:

(a) a leading edge;

(b) a trailing edge spaced from the leading edge;

(c) a base connected to the trailing and leading edges and having a back surface and an arcuate inner surface;

(d) a pair of spaced opposed axial side panels connected to the leading and trailing edges;

(e) each of the side panels having a lower discourager spline seal slot extending longitudinally from the leading edge to the trailing edge of each side panel that is capable of receiving an edge of a discourager spline seal, each lower slot having at least a bottom wall and a top wall;

(f) each of the side panels having an upper primary spline seal slot spaced above the lower slot and extending longitudinally from the leading edge to the trailing edge of each side panel, each upper slot having at least a bottom wall and a top wall, (g) a plurality of cooling air passages extending through the base from the back surface thereof and having spaced outlets exiting from at least one of the side panels between the bottom wall of the top slot and the bottom wall of the lower slot;

(h) a plurality of spaced air flow pathways along the length of the lower slot and below the bottom wall of the upper slot that are capable of receiving air flowing over and above the discourager seal when positioned in the lower slot and passing the air flow around the edge and beneath the discourager seal.

2. The turbine component of claim 1 wherein the plurality of air flow pathways are a plurality of spaced recesses along the bottom wall of the lower slot.

3. The turbine component of claim 2 wherein the bottom wall of the lower slot has a plurality of spaced alternating recesses and lands and wherein each of the outlets of the passages exiting the side panels exit into the lower slot above one of the lands.

4. The turbine component of claim 3 wherein the lower slot has a side wall connecting the bottom wall and the top wall at an edge thereof and wherein the outlets of the passages exit at about the edge connecting the side wall and the top wall.

5. The turbine component of claim 4 wherein each recess extends into the side wall and above the adjacent lands.

6. The turbine component of claim 2 wherein the upper and lower slots extend continuously from the leading edge to the trailing edge of each side panel.

7. The turbine component of claim 1 which is a shroud cooling segment for a high pressure turbine section, a low pressure turbine section or both.

8. A turbine engine cooling subassembly, which comprises:

(1) an adjacent pair of the turbine components of claim 1 having opposed adjacent side panels with a gap therebetween and wherein the spacing of the air flow pathways along the length of the lower slot for each of the adjacent side panels is staggered such that the outlet of each of the passages exiting each adjacent side panel are opposite one of the air flow pathways of the other adjacent side panel;

(2) at least one discourager spline seal positioned in the gap and including a pair of spaced edges having a length and thickness such that each of the edges is capable of being received by the lower slot of one of the adjacent side panels;

(3) the at least one discourager seal being positioned below the outlet of each of the passages exiting each adjacent side panel;

(4) at least one primary spline seal positioned in the gap and including a pair of spaced edges having a length and thickness such that each of the edges is capable of being received by the upper slot of one of the adjacent side panels.

9. The turbine subassembly of claim 8 wherein each of the discourager and primary seals are one continuous piece.

10. A cooling shroud segment for the high pressure and low pressure turbine sections of a gas turbine engine, which has a forward high pressure turbine section and an aft low pressure turbine section and which comprises:

(a) a circumferential leading edge at the forward end of the high pressure turbine section;

(b) a circumferential trailing edge spaced from the leading edge at the aft end of the low pressure turbine section;

(c) an arcuate base connected to the trailing and leading edges and having a back surface and an arcuate inner surface that is in contact with the main gas stream of the gas turbine engine moving in the direction from the leading edge to the trailing edge of the shroud segment;

(d) a pair of spaced opposed axial side panels connected to the leading and trailing edges;

(e) each of the side panels having a lower discourager spline seal slot extending longitudinally from the leading edge to the trailing edge of each side panel, each lower slot having a bottom wall, a top wall, and a side wall connected to the bottom and top walls at an edge thereof, the bottom wall having a plurality of spaced alternating lands and recesses along the length thereof;

(f) each of the side panels having an upper primary spline seal slot spaced above the lower slot and extending longitudinally from the leading edge to the trailing edge of each side panel, each upper slot having at least a bottom wall and a top wall, (g) a plurality of cooling air passages extending through the base from the back surface thereof and having outlets exiting into the lower slot of at least one of the side panels and above one of the lands of the bottom wall of the lower slot.

11. The shroud segment of claim 10 wherein the upper and lower slots extend continuously from the leading edge to the trailing edge of each side panel.

12. The shroud segment of claim 11 wherein no passages exit into the lower slot at about the transition from the aft end of the high pressure turbine section to the forward end of the low pressure turbine section of the shroud segment.

13. The shroud segment of claim 12 wherein no passages exit into the lower slot at about the trailing edge of the low pressure turbine section of the shroud segment.

14. The shroud segment of claim 11 wherein the outlets of the passages exit at about the edge connecting the side wall and the top wall.

15. The shroud segment of claim 11 wherein each recess extends into the side wall and above the adjacent lands.

16. The shroud segment of claim 11 wherein the high pressure turbine section has a forward post-impingement pocket that feeds cooling air into the passages having outlets exiting into the lower slot at the forward end of the high pressure turbine section and an aft sub-impingement pocket that feeds cooling air into the passages having outlets exiting into the lower slot at the aft end of the high pressure turbine section.

17. A shroud subassembly for the high pressure and low pressure turbine sections of a gas turbine engine, which comprises:

(a) a pair of adjacent shroud segments, each of the shroud segments comprising a high pressure turbine section having a high pressure impingement cavity and a low pressure turbine section having a low pressure impingement cavity, each shroud segment further comprising:
(1) a circumferential leading edge at the forward end of the high pressure turbine section;
(2) a circumferential trailing edge spaced from the leading edge at the aft end of the low pressure turbine section;
(3) an arcuate base connected to the trailing and leading edges and having a back surface and an arcuate inner surface that is in contact with the main gas stream of the gas turbine engine moving in the direction from the leading edge to the trailing edge of the shroud segment;
(4) a pair of spaced opposed axial side panels connected to the leading and trailing edges;
(5) each of the side panels having a lower discourager spline seal slot extending longitudinally from the leading edge to the trailing edge of each side panel, each lower slot having a bottom wall, a top wall, and a side wall connected to the bottom and top wall at an edge thereof, the bottom wall having a plurality of spaced alternating lands and recesses along the length thereof;
(6) each of the side panels having an upper primary spline seal slot above the lower slot and extending longitudinally from the leading edge to the trailing edge of each side panel, each upper slot having at least a bottom wall and a top wall;
(7) a plurality of cooling air passages extending through the base from the back surface thereof and having outlets exiting into the lower slot of at least one of the side panels and above one of the lands of the bottom wall of the lower slot;
(8) wherein the opposed adjacent side panels of the pair of shroud segments have a gap therebetween and wherein the spacing of the lands and recesses in the bottom wall of the lower slot for each of the adjacent side panels is staggered such that the lands of one of the adjacent panels are opposite the recesses of the other adjacent side panel;

(b) at least one discourager spline seal positioned in the gap and including a pair of spaced edges having a length and thickness such that each of the edges is capable of being received by the lower slot of one of the adjacent side panels;
(c) the at least one discourager seal being positioned above each land of the bottom wall of each lower slot and below the outlets exiting into each lower slot and having a width smaller than the combined width of the gap and the bottom wall of the lower slots of the adjacent side panels such that at least a portion of each recess of the bottom wall adjacent the side wall of each lower slot is capable of
(d) being accessible to air flow;
(e) at least one primary spline seal positioned in the gap and including a pair of spaced edges having a length and thickness such that each of the edges is capable of being received by the upper slot of one of the adjacent side panels;
(f) the at least one discourager seal and the at least one primary seal defining therebetween an intermediate pressure cavity having a pressure lower than the pressure of the high pressure impingement cavity and the low pressure impingement cavity and a pressure higher than the pressure of the main gas stream in the vicinity of high pressure turbine and low pressure turbine sections of the shroud segment.

18. The shroud subassembly of claim 17 wherein the upper and lower slots extend continuously from the leading edge to the trailing edge of each side panel.

19. The shroud subassembly of claim 18 wherein each of the discourager and primary seals are one continuous piece.

20. The shroud subassembly of claim 18 wherein, for each shroud segment, no cooling air passages exit into the lower slot at about the transition from the aft end of the high pressure turbine section to the forward end of the low pressure turbine section and at about the trailing edge of the low pressure turbine section.

* * * * *